(12) United States Patent
Kadav et al.

(10) Patent No.: US 12,198,397 B2
(45) Date of Patent: Jan. 14, 2025

(54) KEYPOINT BASED ACTION LOCALIZATION

(71) Applicant: NEC Laboratories America, Inc., Princeton, NJ (US)

(72) Inventors: Asim Kadav, Mountain View, CA (US); Farley Lai, Santa Clara, CA (US); Hans Peter Graf, South Amboy, NJ (US); Yi Huang, San Diego, CA (US)

(73) Assignee: NEC Corporation, Tokyo (JP)

( * ) Notice: Subject to any disclaimer, the term of this patent is extended or adjusted under 35 U.S.C. 154(b) by 393 days.

(21) Appl. No.: 17/586,284

(22) Filed: Jan. 27, 2022

(65) Prior Publication Data

US 2022/0237884 A1    Jul. 28, 2022

Related U.S. Application Data

(60) Provisional application No. 63/142,602, filed on Jan. 28, 2021.

(51) Int. Cl.
*G06V 10/26* (2022.01)
*G06T 7/246* (2017.01)
*G06V 10/44* (2022.01)
*G06V 10/82* (2022.01)
*G06V 20/58* (2022.01)
(Continued)

(52) U.S. Cl.
CPC .............. *G06V 10/26* (2022.01); *G06T 7/251* (2017.01); *G06V 10/44* (2022.01); *G06V 10/82* (2022.01); *G06V 20/58* (2022.01); *G06V 40/10* (2022.01); *G08G 1/166* (2013.01); *G06T 2207/30261* (2013.01)

(58) Field of Classification Search
CPC ........ G06V 10/26; G06V 10/44; G06V 10/82; G06V 20/58; G06V 40/10; G06V 20/46; G06T 7/251; G06T 2207/30261; G08G 1/166
See application file for complete search history.

(56) References Cited

U.S. PATENT DOCUMENTS

| 9,437,009 | B2 * | 9/2016 | Medioni | G06T 7/20 |
| 2020/0074678 | A1 * | 3/2020 | Ning | G06V 10/764 |
| 2020/0184278 | A1 * | 6/2020 | Zadeh | G06N 3/044 |

(Continued)

OTHER PUBLICATIONS

Feichtenhofer, Christoph, et al. "Slowfast networks for video recognition", InProceedings of the IEEE/CVF International conference on computer vision. Oct. 2019, pp. 6202-6211.

(Continued)

*Primary Examiner* — Chan S Park
*Assistant Examiner* — Devin J Dhooge
(74) *Attorney, Agent, or Firm* — Joseph Kolodka

(57) ABSTRACT

A computer-implemented method is provided for action localization. The method includes converting one or more video frames into person keypoints and object keypoints. The method further includes embedding position, timestamp, instance, and type information with the person keypoints and object keypoints to obtain keypoint embeddings. The method also includes predicting, by a hierarchical transformer encoder using the keypoint embeddings, human actions and bounding box information of when and where the human actions occur in the one or more video frames.

20 Claims, 5 Drawing Sheets

(51) Int. Cl.
G06V 40/10 (2022.01)
G08G 1/16 (2006.01)

(56) References Cited

U.S. PATENT DOCUMENTS

2020/0359064 A1* 11/2020 Zhou .................... H04N 21/816
2020/0394413 A1* 12/2020 Bhanu .................. A63B 67/002
2021/0076105 A1*  3/2021 Parmar .......... H04N 21/234336

OTHER PUBLICATIONS

Cao, Zhe, et al. "OpenPose: realtime multi-person 2D pose estimation using Part Affinity Fields", IEEE transactions on pattern analysis and machine intelligence. Jul. 17, 2019, pp. 172-186.

Carreira, Joao, et al. "Quo vadis, action recognition? a new model and the kinetics dataset" Inproceedings of the IEEE Conference on Computer Vision and Pattern Recognition. Jul. 2017, pp. 6299-6308.

Devlin, Jacob, et al. "Bert: Pre-training of deep bidirectional transformers for language understanding", InProceedings of NAACL-HLT. May 2019, pp. 4171-4186.

Du, Wenbin, et al. "Rpan: An end-to-end recurrent pose-attention network for action recognition in videos", InProceedings of the IEEE International Conference on Computer Vision. Oct. 2017, pp. 3725-3734.

Du, Yong, et al. "Hierarchical recurrent neural network for skeleton based action recognition", InProceedings of the IEEE conference on computer vision and pattern recognition. Jun. 2015, pp. 1110-1118.

Feichtenhofer, Christoph, et al. "Convolutional two-stream network fusion for video action recognition", InProceedings of the IEEE conference on computer vision and pattern recognition. Jun. 2016, pp. 1933-1941.

Feng, Yutong, et al. "Relation Modeling in Spatio-Temporal Action Localization", arXiv preprint arXiv:2106.08061. Jun. 16, 2021, pp. 1-6.

Gavrilyuk, Kirill, et al. "Actor-transformers for group activity recognition", InProceedings of the IEEE/CVF Conference on Computer Vision and Pattern Recognition. Jun. 2020, pp. 839-848.

Girdhar, Rohit, et al. "Video action transformer network", InProceedings of the IEEE/CVF Conference on Computer Vision and Pattern Recognition. Jun. 2019, pp. 244-253.

Gkioxari, Georgia, et al. "Detecting and recognizing human-object interactions", InProceedings of the IEEE Conference on Computer Vision and Pattern Recognition. Jun. 2018, pp. 8359-8367.

Gu, Chunhui, et al. "Ava: A video dataset of spatio-temporally localized atomic visual actions", InProceedings of the IEEE Conference on Computer Vision and Pattern Recognition. Jun. 2018, pp. 6047-6056.

He, Kaiming, et al. "Mask r-cnn", InProceedings of the IEEE international conference on computer vision. Oct. 2017, pp. 2961-2969.

Jhuang, Hueihan, et al. "Towards understanding action recognition", InProceedings of the IEEE international conference on computer vision. Dec. 2013, pp. 3192-3199.

Lin, Ji, et al. "Tsm: Temporal shift module for efficient video understanding", InProceedings of the IEEE/CVF International Conference on Computer Vision. Oct. 2019, pp. 7083-7093.

Liu, Ziyu, et al. "Disentangling and unifying graph convolutions for skeleton-based action recognition", InProceedings of the IEEE/CVF conference on computer vision and pattern recognition. Jun. 2020, pp. 143-152.

Ma, Chih-Yao, et al. "TS-LSTM and temporal-inception: Exploiting spatiotemporal dynamics for activity recognition", Signal Processing: Image Communication. Feb. 1, 2019, pp. 76-87.

Ma, Chih-Yao, et al. "Attend and interact: Higher-order object interactions for video understanding", InProceedings of the IEEE Conference on Computer Vision and Pattern Recognition. Jun. 2018, pp. 6790-6800.

Obinata, Yuya, et al. "Temporal Extension Module for Skeleton-Based Action Recognition", In2020 25th International Conference on Pattern Recognition (ICPR). Jan. 10, 2021, pp. 534-540.

Pan, Junting, et al. "Actor-context-actor relation network for spatio-temporal action localization", InProceedings of the IEEE/CVF Conference on Computer Vision and Pattern Recognition.Jun. 2021, pp. 464-474.

Shao, Hao, et al. "Temporal interlacing network", InProceedings of the AAAI Conference on Artificial Intelligencevol. 34, No. 07. Apr. 3, 2020, pp. 11966-11973.

Snower, Michael, et al. "15 keypoints is all you need", InProceedings of the IEEE/CVF Conference on Computer Vision and Pattern Recognition. Jun. 2020, pp. 6738-6748.

Song, Sijie, et al. "An end-to-end spatio-temporal attention model for human action recognition from skeleton data", InProceedings of the AAAI conference on artificial intelligence, vol. 31, No. 1. Feb. 12, 2017, pp. 4263-4270.

Wang, Fei, et al. "Can WiFi estimate person pose?", arXiv preprint arXiv:1904.00277. Apr. 2, 2019, pp. 1-11.

Wang, Jingdong, et al. "Deep high-resolution representation learning for visual recognition", IEEE transactions on pattern analysis and machine intelligence. Mar. 13, 2020, pp. 1-23.

Wang, Limin, et al. "Temporal segment networks: Towards good practices for deep action recognition", InEuropean conference on computer vision, Springer, Cham. Oct. 8, 2016, pp. 20-36.

Wang, Saiwen, et al. "Interacting with soli: Exploring fine-grained dynamic gesture recognition in the radio-frequency spectrum", InProceedings of the 29th Annual Symposium on User Interface Software and Technology. Oct. 16, 2016, pp. 851-860.

Wang, Wei, et al. "Pose-based two-stream relational networks for action recognition in videos", arXiv preprint arXiv:1805.08484. May 22, 2018, pp. 1-15.

Wu, Zuxuan, et al. "Multi-stream multi-class fusion of deep networks for video classification", InProceedings of the 24th ACM international conference on Multimedia. Oct. 1, 2016, pp. 791-800.

Yan, Sijie, et al. Spatial temporal graph convolutional networks for skeleton-based action recognition. InThirty-second AAAI conference on artificial intelligence. Apr. 27, 2018, pp. 7444-7452.

* cited by examiner

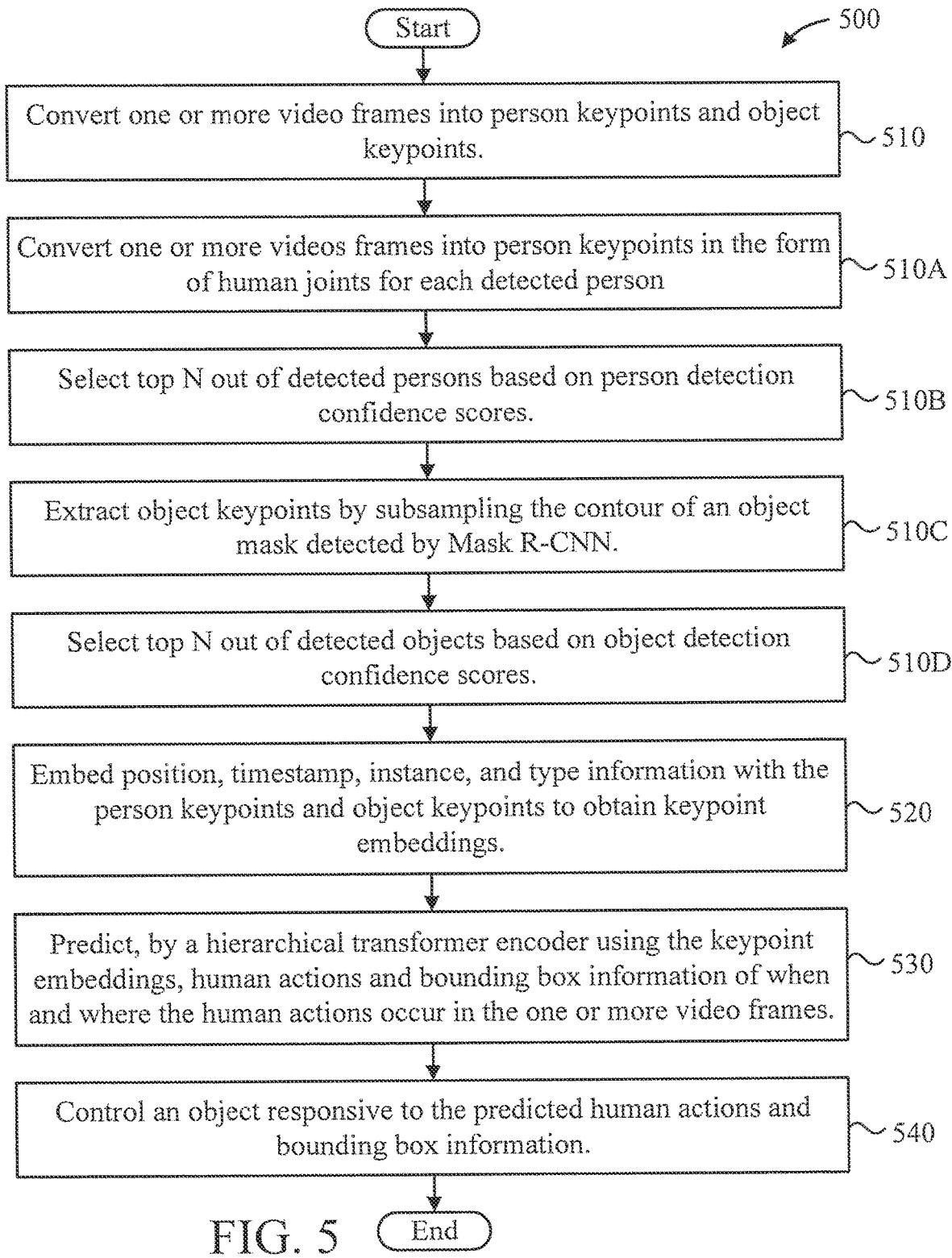

KEYPOINT BASED ACTION LOCALIZATION

RELATED APPLICATION INFORMATION

This application claims priority to U.S. Provisional Patent Application No. 63/142,602, filed on Jan. 28, 2021, incorporated herein by reference in its entirety.

BACKGROUND

Technical Field

The present invention relates to object tracking and more particularly to keypoint based action localization.

Description of the Related Art

Given a video, and a query that requests the final location of a specific object in the video, the task is to locate the final location of the object in the video. The video consists of a large number of objects or a person moving through time. It is quite challenging to localize the object within the video as it moves around in the video through occlusions or hides at different camera angles.

SUMMARY

According to aspects of the present invention, a computer-implemented method is provided for action localization. The method includes converting one or more video frames into person keypoints and object keypoints. The method further includes embedding position, timestamp, instance, and type information with the person keypoints and object keypoints to obtain keypoint embeddings. The method also includes predicting, by a hierarchical transformer encoder using the keypoint embeddings, human actions and bounding box information of when and where the human actions occur in one or more video frames.

According to other aspects of the present invention, a computer program product is provided for action localization. The computer program product includes a non-transitory computer readable storage medium having program instructions embodied therewith. The program instructions are executable by a computer to cause the computer to perform a method. The method includes converting, by a processor device of the computer, one or more video frames into person keypoints and object keypoints. The method further includes embedding, by the processor device, position, timestamp, instance, and type information with the person keypoints and object keypoints to obtain keypoint embeddings. The method also includes predicting, by a hierarchical transformer encoder of the computer using the keypoint embeddings, human actions and bounding box information of when and where the human actions occur in the one or more video frames.

According to yet other aspects of the present invention, a computer processing system is provided for action localization. The computer processing system includes a memory device for storing program code. The computer processing system further includes a processor device for operatively coupled to the memory device for running the program code to convert one or more video frames into person keypoints and object keypoints. The processor device further runs the program code to embed position, timestamp, instance, and type information with the person keypoints and object keypoints to obtain keypoint embeddings. The processor device also runs the program code to predict, using a hierarchical transformer encoder that inputs the keypoint embeddings, human actions and bounding box information of when and where the human actions occur in the one or more video frames These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a flow diagram showing an exemplary method for keypoint based action localization, in accordance with an embodiment of the present invention.

DETAILED DESCRIPTION OF PREFERRED EMBODIMENTS

Embodiments of the present invention are directed to keypoint based action localization.

Embodiments of the present invention propose a method to address the action localization problem using just keypoint information. This proposed approach does not use any RGB information in the video processing pipeline. Hence, using LIDAR data or other NFC data that gives keypoints, it is possible to perform action recognition and localization, which was not previously possible.

Embodiments of the present invention are distinct since they just use keypoint information to predict action localization results. Embodiments of the present invention provide a top-down architecture that first detects the bounding boxes of all actors in each frame and then classifies the actions they are doing at a given timestamp. The model includes three stages followed by the idea of tubelet action recognition. First, a set of keypoints are identified as the "Action Representation" for a video clip of T frames. Second, a Keypoints Embedding Network projects keypoints to more representative features by adding the knowledge of spatial-temporal information and the characteristic of keypoints. This includes embedding information like position, type, etc. Finally, an Action Tagger Network learns the higher-order interactive features and assigns action tags to each actor.

Figure 1:
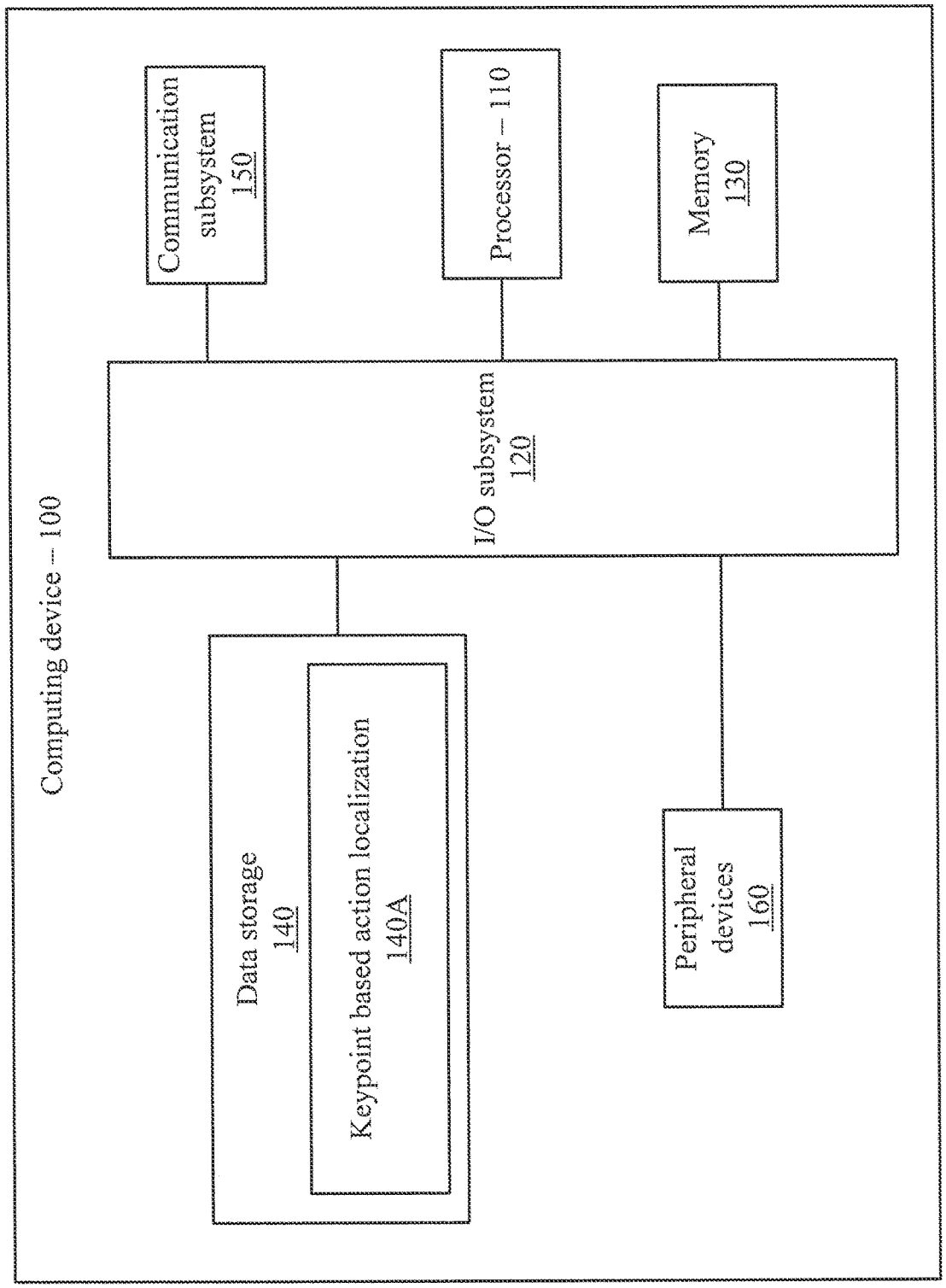
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform keypoint based action localization.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for keypoint based action recognition. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
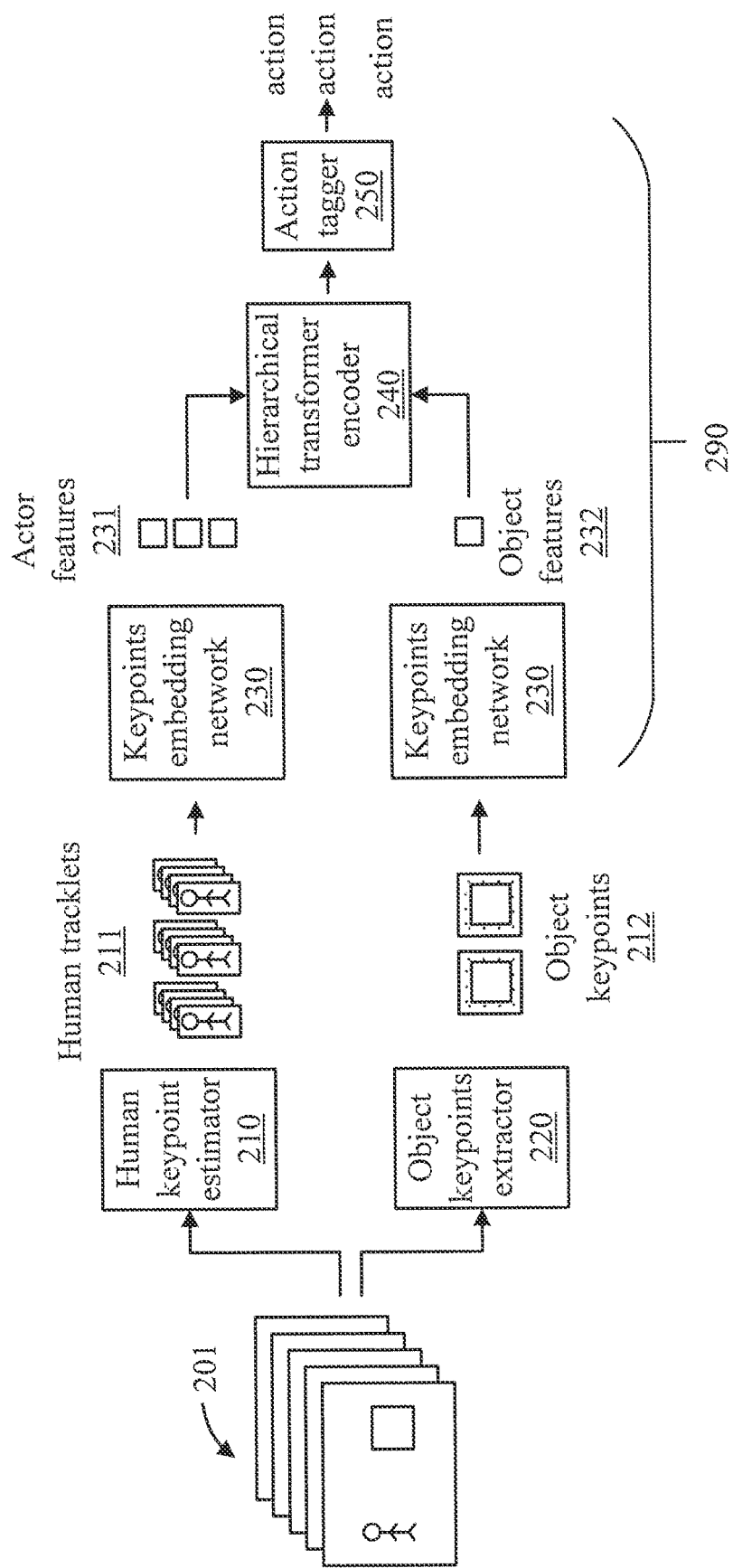
FIG. 2 is a block diagram showing an exemplary system for keypoint based action localization, in accordance with an embodiment of the present invention.

FIG. 2 is a block diagram showing an exemplary system 200 for keypoint based action localization, in accordance with an embodiment of the present invention.

The task here is that given a video 201, the goal is to localize the actions in the video 201. The video 201 can be in RGB format or just a collection of keypoints using LIDAR information. In case of RGB input, the video 201 is converted to keypoints using one or more computer vision algorithms. Specifically, human tracklets 211 and object keypoints 212 are extracted from the video 201 using HRNet 210, a top-down human keypoint estimator, and an object keypoint extractor 212 based on the computer vision algorithms. This is passed over to KeyNet architecture 290 that uses position, timestamp, instance and type embeddings for object keypoints 212 and person tracklets 211. Actor features 231 and object features 232 from the Keypoints Embedding Networks 230 are then passed to a hierarchical transformer encoder 240. The output of the hierarchical transformer encoder 240 is used for the action tagger network 250 to classify output actions.

Figure 3:
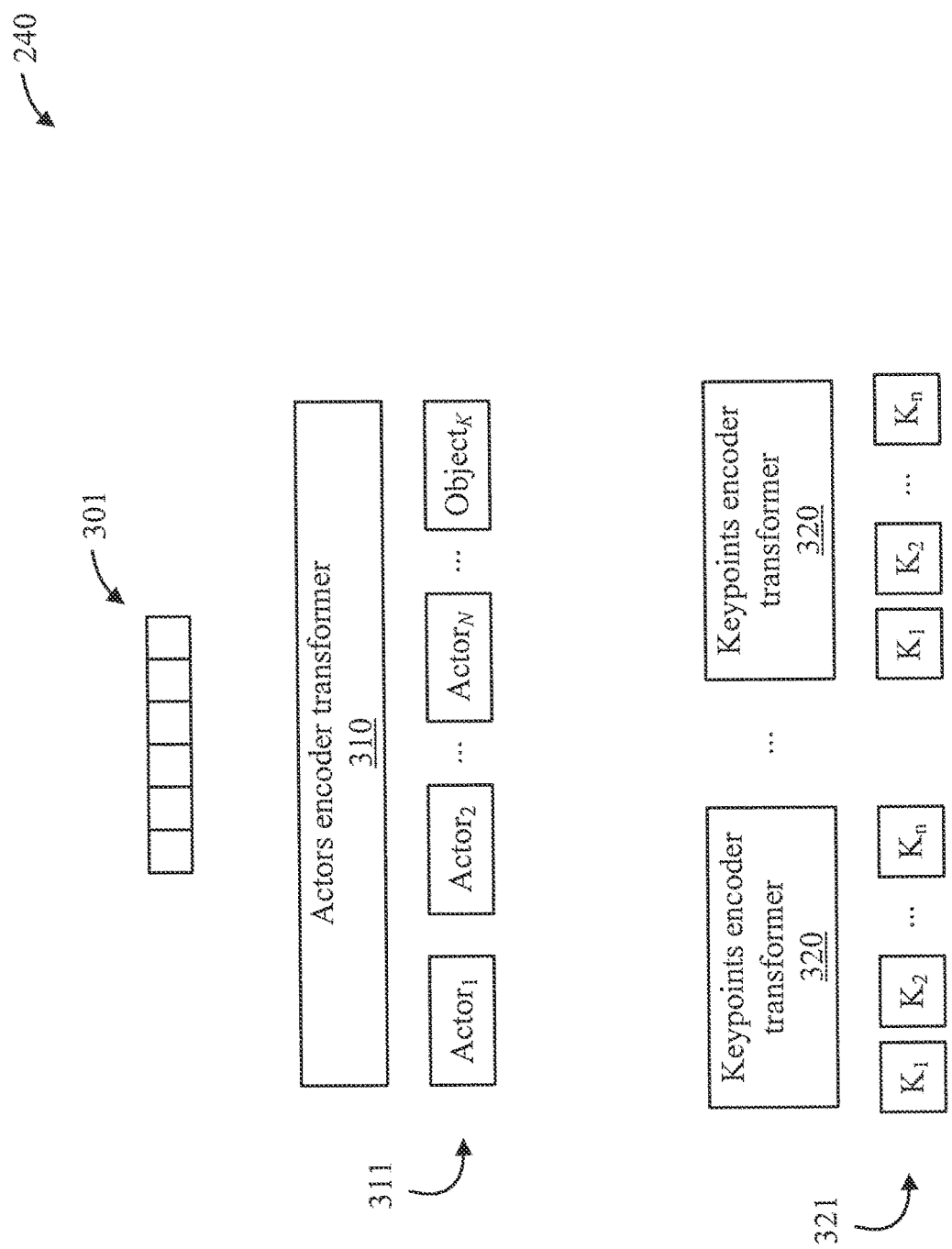
FIG. 3 is a block diagram further showing the hierarchical transformer encoder of FIG. 2, in accordance with an embodiment of the present invention.

FIG. 3 is a block diagram further showing the hierarchical transformer encoder 240 of FIG. 2, in accordance with an embodiment of the present invention.

The hierarchical transformer encoder 240 includes keypoints encoder transformers 320 to learn the action-level representations from the keypoint embeddings of each actor and object through time.

The hierarchical transformer encoder 240 further includes an Actors Encoder Transformer 310 to learn the actor-level representations for action localization.

Figure 4:
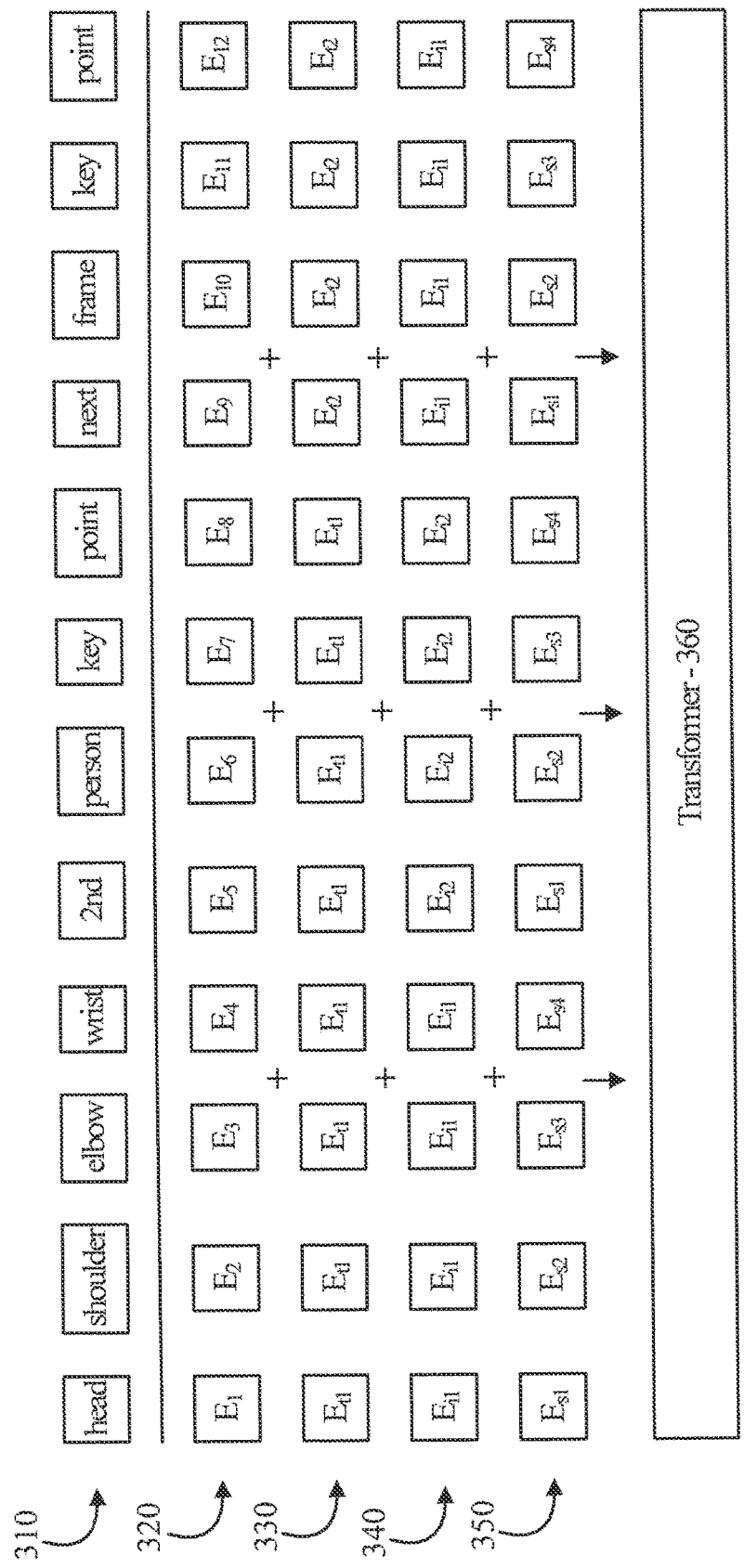
FIG. 4 is a block diagram further showing the keypoints embedding network of FIG. 2, in accordance with an embodiment of the present invention.

FIG. 4 is a block diagram further showing the Keypoints Embedding Network 230 of FIG. 2, in accordance with an embodiment of the present invention.

The Keypoints Embedding Network 230 learns keypoints embeddings 310 based on the combination of position tokens 320, timestamp tokens 330, instance tokens 340, and type (e.g., head, shoulder, wrist, etc.) tokens 350, through a transformer 360. A position token 320 encodes the position of a keypoint in a frame. A timestamp token 330 encodes the frame time index in a scene sequence. An instance token 340 encodes a person or an object id in a frame. A type token 350 encodes the body part type of a keypoint or a sampled object keypoint index.

FIG. 5 is a flow diagram showing an exemplary method 500 for keypoint based action localization, in accordance with an embodiment of the present invention.

At block 510, convert one or more video frames into person keypoints and object keypoints.

In an embodiment, block 510 can include one or more of blocks 510A through 510D.

At block 510A, convert one or more videos frames into person keypoints in the form of human joints for each detected person.

At block 510B, select top N out of detected persons based on person detection confidence scores.

At block 510C, extract object keypoints by subsampling the contour of an object mask detected by Mask R-CNN.

At block 510D, select top N out of detected objects based on object detection confidence scores.

At block 520, embed position, timestamp, instance, and type information with the person keypoints and object keypoints to obtain keypoint embeddings.

At block 530, predict, by a hierarchical transformer encoder using the keypoint embeddings, human actions and bounding box information of when and where the human actions occur in the one or more video frames.

At block 540, control an object responsive to the predicted human actions and bounding box information. For example, control a vehicle system for accident avoidance responsive to the predicted human actions and the bounding box information. As another example, control a robotic system for collision avoidance responsive to the predicted human actions and the bounding box information.

A description will now be given regarding the overall design of the present invention as shown in FIG. 2. A goal is to validate the hypothesis that whether or not using sparse keypoints can solve the general action recognition problem. Embodiments of the present invention provide a top-down architecture that first detects the bounding box of all actors in each frame and then classifies the actions they are doing at a given timestamp.

The model includes three stages followed by the idea of tubelet action recognition. First, a set of keypoints are identified as the Action Representation for a video clip 201 of T frames. Second, the Keypoints Embedding Network 230 projects keypoints to more representative features by adding the knowledge of spatial-temporal information and the characteristic of keypoints. Finally, the action tagger network 250 learns the higher-order interactive features and assign action tags to each actor.

A description will now be given regarding action representation, in accordance with an embodiment of the present invention.

Scene sequence: Embodiments of the present invention have designed the action representation as a scene sequence as follows:

$$D=(H_1,H_2 \ldots H_N,O_1,O_2,\ldots,O_K)$$

where $H_i=(P_1, P_2, \ldots, P_{k_h})$ is the set of $k_h$ keypoints from the $i_{th}$ human tracklet through time and $O_j=(P_1, P_2, \ldots, P_{k_o})$ is the set of $k_o$ keypoints from the $j_{th}$ object.

To obtain the scene sequence D as the action representation, we proposed a keypoints sampling method to extract N human tracklets $H_i$ for actor features and M objects keypoints as $O_j$ for contextual features.

Human Tracklet. To get N human tracklets, we combine a person detector with traction, an IoU-based tracker, to build person tracklets 211 over T frames. Then an off-the-shelf keypoint estimator is used to extract $k_h$ human joints information for each detected person over the T frames.

By selecting the top N people based on the detection confidence scores, those human tracklets consist of $N \times k_h \times T$ keypoints.

Object Keypoint. The purpose to extract object keypoints is to provide contextual features in scenes to enhance the performance for those object interactive actions. Here, an assumption is made that human-object interactive actions can be modeled by a set of class-agnostic keypoints with only its shape and spatial information. Therefore, object keypoints are extracted by subsampling the contour of the object mask detected by Mask R-CNN.

Specifically, for each video clip, a Mask R-CNN detector is applied to its keyframe to collect the class-agnostic object masks and for each mask, the Theo Pavlidis' Algorithm or other computer vision algorithm is leveraged for contour tracing. Finally, by applying an equal distance sampling, the object keypoints are extracted and have the same interval along the contour of the detected mask.

Hence, by selecting the top K objects with the highest confidence scores in a keyframe, O can be obtained from $K \times k_o$ keypoints for each video clip.

Keypoints Embedding Network

To effectively learn atomic actions in keypoints representations, the spatial correlation of each joint should be learned as well as how these joints transform in a video clip with T frames. Therefore, each keypoint in a scene sequence is converted into a sequence of tokens and each token is linearly projected into an embedding E, a learnable lookup table to model the relationship of each keypoint.

Tokenization: The goal of tokenization is to convert a scene sequence into more representative information for learning the spatial-temporal correlation between each tracklet and the contextual object keypoints. To achieve this goal, prior tokenization techniques are extended into a multi-instance and multi-category scenario to provide the embeddings for embodiments of the present invention. For Position Token and Type Token, each keypoint is provided with representations of spatial locations, temporal location index, and the unique type information (e.g., Head, Shoulder and Wrist.) respectively. A contribution of the present invention is that by extending Segment Token to T frames and addressing the idea of Instance Token to indicate the ids of tracklets that keypoints belong to in the current scene, the application of previous tokenization methods from pair-wise matching are generalized to jointly provide information of the spatial-temporal correlation of multiple instances at the same time. It is now described how to convert a scene sequence to 4 kinds of tokens in detail below:

Position Token: The down-sampled spatial location of the original image gives the unique representation of each pixel coordinate. For a keypoint P, its Position Token is written as $\rho$ with the 2D position range in ([1, W'], [1, H']), where W' and H' are down-sampled width and height. This reduces the computational cost while preserving the spatial correlation of each keypoint in the frame. The general expression of Position Token is as follows, where $\rho_n^{P_k^t}$ indicates the Position Token of the $k_{th}$ keypoint from the $n_{th}$ person at timestamp t:

$$\{\rho_1^{p1^1}, \rho_1^{p2^1} \ldots \rho_2^{p1^t}, \rho_2^{p2^t} \ldots \rho_{N-1}^{pK^T} \ldots \rho_N^{pK^T}\} \quad (1)$$

Type Token: The Type Token represents the characteristics of the human body parts (i.e., Head, Right Shoulder and Left Wrist). The Type Token ranges in [1, K], where K is the number of keypoints. The Type Token provides the knowledge of how each human body part evolved in the keypoint sequence, which is essential to achieve high accuracy at low resolution. The Type Token $k_n^{p^t}$ is assigned to the $k_{th}$ keypoint at timestamp t of the $n_{th}$ person. A general expression for Type Tokens are shown below as follows:

$$\{1_1^{p^1}, 2_1^{p^1}, \ldots 1_2^{p^1}, 2_2^{p^1}, \ldots (K-1)_N^{p^T} \ldots K_N^{p^T}\} \quad (2)$$

Segment Token: The segment token embeds the timestamp information with keypoints $p^t$ at time t. According to our setting of the scene sequence, the range of segment token is in [1, T] where T is the total number of frames in a video clip. We assign the segment token $t_n^{p^k}$ to the keypoints at frame t from the $n_{th}$ person. The general expression of the Segment token is shown in Equation 3 as follows:

$$\{1_1^{p1}, 1_1^{p2} \ldots 1_2^{p1}, 1_2^{p2} \ldots T_{N-1}^{pK} \ldots T_N^{pK}\} \quad (3)$$

Instance Token: The instance token provides the spatial correlation between a keypoint $P^t$ and its corresponding person instance n in a frame. The instance token serves as a similar role to the segment token while it provides spatial instead of temporal information. The instance token $n_n^{P_k^t}$ is assigned to $\rho_n^{P_k^t}$, the $k_{th}$ keypoint of the $n_{th}$ person instance at frame t. The general expression of the Instance token is shown in Equation 4 as follows:

$$\{1^{p1^1}, 1^{p2^1}, \ldots 2^{p1^1}, 2^{p2^1}, \ldots (N-1)^{pK^T} \ldots N^{pK^T}\} \quad (4)$$

After tokenizing the scene sequence with the 4 kinds of the aforementioned tokens, we linearly project each token to 4 kinds of embedding metrics and the output embedding can be obtained by summing information of the 4 tokens. That is, $E = E_{position} + E_{Type} + E_{segment} + E_{instance}$. And the Action Tagger Network 250 takes the embedding E as input to make the actor-level action localization.

Action Tagger Network

The goal of the Action Tagger Network is to learn the spatial-temporal correlation of each keypoint $P^t$ in scene sequence D to predict the actions for each actor subsequence.

To achieve this, similar to making a prediction at the sentence-level and the token-level classification subtask in BERT, the keypoint embedding vector E is fed to a series of self-attention blocks to model high-order interaction between keypoint embeddings. Then, the output representations are fed to fully-connected layers for action localization. Followed by a shared multi-class classifier, the model of the present invention can make actor-level action predictions for each actor in a scene sequence D.

Transformer Network: A typical Transformer implementation creates three vectors from each of the input vectors (here, the embedding of each keypoint). So for each keypoint, the following are created: a Query vector (Q); a Key vector (K); and a Value vector (V). Next, the transformer network scores the keypoints pairwise in the scene sequence D by taking the dot product of Q keypoint and K keypoint. Finally, the transformer network normalizes the scores with $\sqrt{d}$ and a soft-max operation, where d is the embedding dimension. By multiplying each V keypoint by the softmax score, the result can be obtained by summing up the weighted V keypoints. This is the so-called self-attention that can be expressed in the following equation:

$$\text{Attention}(Q, K, V) = \text{softmax}\left(\frac{QK^T}{\sqrt{d}}\right) \quad (5)$$

Hierarchical Transformer Encoder: However, as the length of the input embedding sequence increases, the computational complexity of the Transformer Network grows quadratically due to the pairwise self-attention between the input embeddings. Therefore, to address this quadratic inefficiency, the representation of each actor is learned in a hierarchical manner instead of learning all keypoints in a single transformer. Specifically, a keypoints encode transformer will first encode the embedding of the keypoints $E^{\rho_n^t}$ into a list of action-level representations. We take the representation $h^{\rho_n^t}$ as the feature for human keypoints at frame t as follows:

$$E^{\rho_n^t} = (e_1^{\rho_n^t}, e_2^{\rho_n^t}, \ldots e_K^{\rho_n^t}) \text{ where } e_K^{\rho_n^t} = \rho_n^{P_k^t} + k_n^{p^t} \quad (6)$$

$$h^{\rho_n^t} = \text{Transformer}(E^{\rho_n^t}) \quad (7)$$

where $\rho_n^{P_k^t}$ is the Position token and $k_n^{p^t}$ is the Type token.

Then, an actor encode transformer will encode the person tracklet representation $d^{\rho_n}$ through time from $(h^{\rho_n^1}, h^{\rho_n^2} \ldots h^{\rho_n^T})$. The collective context sensitive tracklet representations of each person in the scene sequence can be represented as $(d^{\rho_1}, d^{\rho_2}, \ldots d^{\rho_N})$. Finally, the actor-level action is derived by linearly projecting $d^{\rho_n}$ to the number of total classes in the dataset as follows:

$$R^{\rho_n} = (r^{\rho_n^1}, r^{\rho_n^2}, \ldots r^{\rho_n^T}) \text{ where } r^{\rho_n^t} = h^{\rho_n^t} + n^{p^t} + t_n^p \quad (8)$$

$$d^{\rho_n} = \text{Transformer}(R^{\rho_n}) \quad (9)$$

where $n^{p^t}$ is the Instance Token and $t_n^p$ is the Segment Token for the $n_{th}$ instance at frame time t.

RGB Features Extractor

To validate the effectiveness of the representation gathered by our proposed KeyNet, an RGB based architecture is built using full information in every actor tracklet to predict actions. For this, the same strategy is applied as the above to build human tracklets by directly cropping the actor sub-image instead of extracting K keypoints for each detected person.

Regarding the RGB feature extractor, first the image-based features of each actor are extracted with HRNet. Then the features are linearly projected to the same output dimension of the Keypoint Embedding Network. Since the image features are extracted frame by frame, it includes no clue of the spatial correlation and temporal ordering. Hence, the same embedding techniques are applied as the keypoints embedding network to address the spatial-temporal correlation. For spatial correlation, the position token is based on the center of an actor bounding box. The same Segment Token in the Keypoints Embedding Network is used to provide temporal clues. Hence, the resulting feature of each actor is the sum of (1) image features extracted from HRNet, (2) position embedding for spatial correlation and (3) segment embedding for temporal clues. By feeding this representation to the proposed action tagger network 250, the performance of features extracted from images are compared with features derived from keypoints.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for action localization, comprising:
   converting one or more video frames into person keypoints and object keypoints;
   embedding position, timestamp, instance, and type information with the person keypoints and object keypoints to obtain keypoint embeddings; and
   predicting, by a hierarchical transformer encoder using the keypoint embeddings, human actions and bounding box information of when and where the human actions occur in the one or more video frames, the embedding including converting the keypoints to tokens, and the predicting including projecting the tokens to embedding metrics and summing the embedding metrics to obtain an output keypoint embedding.

2. The computer-implemented method of claim 1, wherein said converting converts the one or more video frames into person keypoints in a form of human joint names for each detected person.

3. The computer-implemented method of claim 2, wherein said converting further comprises selecting a top N out of detected persons based on person detection confidence scores.

4. The computer-implemented method of claim 1, wherein said converting comprises extracting the object keypoints by subsampling a contour of an object mask detected by a Mask R-CNN.

5. The computer-implemented method of claim 4, wherein said converting further comprises selecting top N out of detected objects based on object detection confidence scores.

6. The computer-implemented method of claim 1, further comprising learning atomic actions from the person keypoints and the object keypoints.

7. The computer-implemented method of claim 1, wherein the position information comprises a down-sampled spatial location of each pixel coordinate.

8. The computer-implemented method of claim 1, wherein the timestamp information comprises a difference between a keypoint timestamp and a beginning keyframe timestamp.

9. The computer-implemented method of claim 1, wherein the instance information comprises a spatial correlation between the person keypoints and a person instance.

10. The computer-implemented method of claim 1, wherein the type information comprises a human body part name.

11. The computer-implemented method of claim 1, wherein the position, timestamp, instance, and type information comprise representative tokens that are linearly projected to a respective keypoint embedding metric and summed to obtain an output keypoint embedding through a transformer based Keypoint Embedding Network.

12. The computer-implemented method of claim 1, further comprising controlling a vehicle system for accident avoidance responsive to the predicted human actions and the bounding box information.

13. The computer-implemented method of claim 1, further comprising controlling a robotic system for collision avoidance responsive to the predicted human actions and the bounding box information.

14. A computer program product for action localization, the computer program product comprising a non-transitory computer readable storage medium having program instructions embodied therewith, the program instructions executable by a computer to cause the computer to perform a method comprising:
   converting, by a processor device of the computer, one or more video frames into person keypoints and object keypoints;
   embedding, by the processor device, position, timestamp, instance, and type information with the person keypoints and object keypoints to obtain keypoint embeddings; and predicting, by a hierarchical transformer encoder of the computer using the embedded keypoints, human actions and bounding box information of when and where the human actions occur in the one or more video frames, the embedding including converting the keypoints to tokens, and the predicting including projecting the tokens to embedding metrics and summing the embedding metrics to obtain an output keypoint embedding.

15. The computer program product of claim 14, wherein said converting converts the one or more video frames into person keypoints in a form of human joint names for each detected persons.

16. The computer program product of claim 15, wherein said converting further comprises selecting a top N out of the detected persons based on person detection confidence scores.

17. The computer program product of claim 14, wherein said converting comprises extracting the object keypoints by subsampling a contour of a mask detected by a Mask R-CNN.

18. The computer program product of claim 17, wherein said converting further comprises selecting top N out of detected objects based on object detection confidence scores.

19. The computer program product of claim 14, further comprising learning atomic actions in the person keypoints and the object keypoints.

20. A computer processing system for action localization, comprising:
  a memory device for storing program code;
  a processor device operatively coupled to the memory device for running the program code for:
    converting one or more video frames into person keypoints and object keypoints;
    embedding position, timestamp, instance, and type information with the person keypoints and object keypoints to obtain keypoint embeddings; and
    predicting, using a hierarchical transformer encoder that inputs the keypoint embeddings, human actions and bounding box information of when and where the human actions occur in the one or more video frames, the embedding including converting the keypoints to tokens, and the predicting including projecting the tokens to embedding metrics and summing the embedding metrics to obtain an output keypoint embedding.

* * * * *